(12) United States Patent
Barton

(10) Patent No.: US 8,740,187 B2
(45) Date of Patent: Jun. 3, 2014

(54) SPLIT VALVE

(75) Inventor: Richard Athol Barton, Manchester (GB)

(73) Assignee: Chargepoint Technology Limited, Liverpool (GB)

( * ) Notice: Subject to any disclaimer, the term of this patent is extended or adjusted under 35 U.S.C. 154(b) by 171 days.

(21) Appl. No.: 13/144,656

(22) PCT Filed: Feb. 12, 2010

(86) PCT No.: PCT/GB2010/050228
§ 371 (c)(1),
(2), (4) Date: Jan. 20, 2012

(87) PCT Pub. No.: WO2010/092395
PCT Pub. Date: Aug. 19, 2010

(65) Prior Publication Data
US 2012/0112108 A1  May 10, 2012

(30) Foreign Application Priority Data
Feb. 12, 2009 (GB) .................................. 0902324.3

(51) Int. Cl.
*F16K 1/22* (2006.01)
*F16K 27/08* (2006.01)

(52) U.S. Cl.
USPC .......................................... 251/305; 251/367

(58) Field of Classification Search
USPC ................... 251/305–308, 367, 143; 123/337
See application file for complete search history.

(56) References Cited

U.S. PATENT DOCUMENTS

| 2,773,706 A | 12/1956 | Leavell |
| 2,962,303 A | 11/1960 | Ramberg |
| 5,332,001 A | 7/1994 | Brown |
| 8,596,316 B2 * | 12/2013 | Koch et al. ................... 141/383 |

FOREIGN PATENT DOCUMENTS

| DE | 737545 C | 7/1943 |
| DE | 835968 C | 4/1952 |
| DE | 1060202 B | 6/1959 |
| DE | 1131472 B | 7/1962 |
| DE | 3844322 A1 | 7/1990 |
| EP | 0122987 A1 | 10/1984 |
| WO | 2007/107500 A1 | 9/2007 |

OTHER PUBLICATIONS

International Search Report received in PCT/GB2010/050228, mailed May 17, 2010.

* cited by examiner

*Primary Examiner* — John K Fristoe, Jr.
*Assistant Examiner* — Michael R Reid
(74) *Attorney, Agent, or Firm* — Suzannah K. Sundby, Esq.; Smith, Gambrell & Russell, LLP

(57) ABSTRACT

A split valve apparatus for the control, charging, discharging and/or regulating the flow of powders, liquids, slurries and/or fluids. The valve has two valve portions complementarily shaped such that the first can sealingly engage with and co-operate with the second to allow the flow of material therethrough. Each valve portion comprises a housing, a valve seat and a valve closure member, which is movable between two positions.

19 Claims, 4 Drawing Sheets

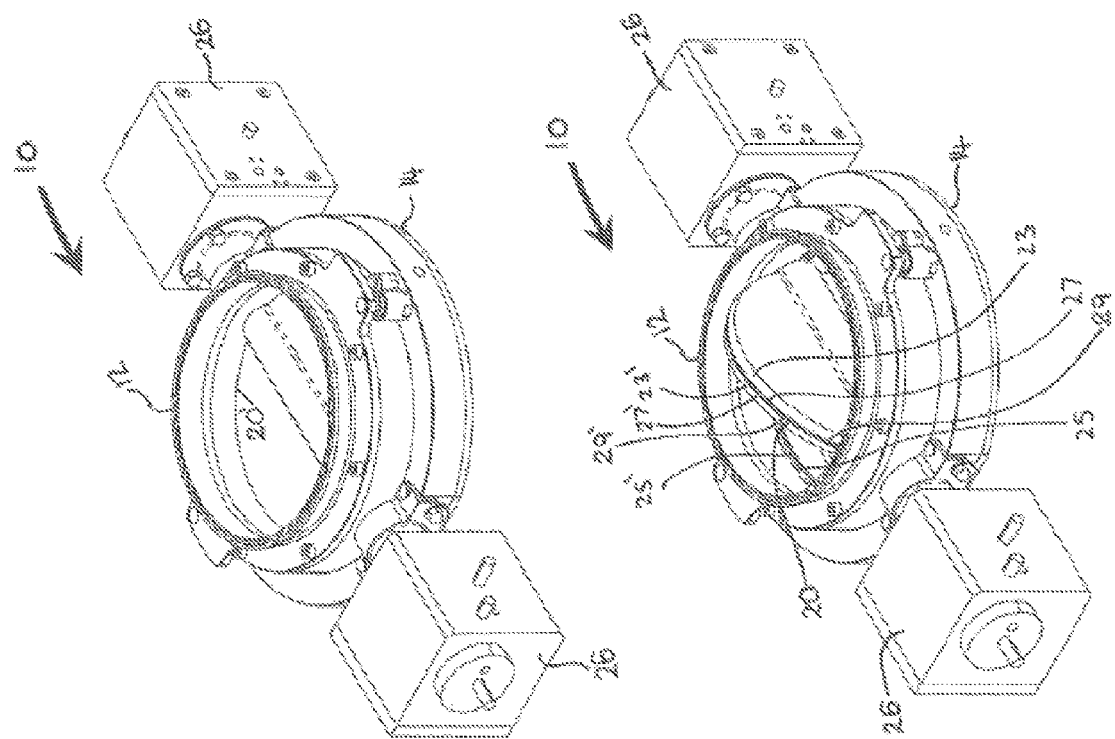

SPLIT VALVE

The present invention relates to valves, and in particular, but not exclusively, to valves for controlling, charging, discharging and/or regulating the flow of powders, liquids, slurries and/or fluids.

Valves, such as split butterfly valves, are available in many designs and used widely for processes where product containment is required to prevent product exposure to environment and personnel working in close proximity of the product. The split valves are designed pre-dominantly for handling and contained transfer of solid state powders and granular material alike.

Split valve design allows the valve to be split open into two halves, commonly called alpha and beta halves, or active and passive halves. The valve design is such that when split, the two halves keep the contents on either side sealed and contained.

Similar to the split butterfly valve, a split ball valve can also be used for contained transfer of solids and more commonly liquids. Historically, these valves have mainly been used in pharmaceutical and biotech industries for non-sterile operations.

In sterile equipment design, full systems need to be sterilised and once sterilised, it is important to ensure sterility is maintained throughout the processing cycle, for example, adding of materials, discharging of materials, any process transfers between systems etc.

Split valves can be sterilised via a number of known methods, which include autoclaving, passing steam through the open valve, or passing other gases, such as vapourised hydrogen peroxide, through them prior to any product coming in contact with the internal surfaces or product contact parts.

In the manufacture of pharmaceuticals, chemicals, biological material and food, effective containment is essential for the safe and hygienic handling of such compounds and materials. At each stage of the manufacturing process, handling must be controlled and managed to provide optimum protection for the operator and for maintaining the integrity of the product.

The material being handled is often hazardous to health, owing to the increasing potency of many new pharmaceutical ingredients. Pharmaceutical and bio-manufacturing products are often manufactured under strict controls against product contamination. This is because the products are often for human consumption and the industries are heavily regulated by bodies like the FDA (Food and Drug Administration) in the United States and the MHRA (Medicines and Healthcare products Regulatory Agency) in the United Kingdom. Furthermore, the pharmaceutical products, such as active pharmaceutical ingredients and/or subsequently diluted powders, may in sufficient quantities be hazardous to the health of an operator. It is therefore necessary to avoid direct contact between an operator and the potentially hazardous material.

Owing to such stringent requirements for there to be a good seal between active and passive elements of the split valve to prevent product exposure to environment and personnel working in close proximity of the product, manufacture of the elements of the valve are under stringent conditions to ensure that the dimensions of the elements are precisely manufactured to ensure stringent tolerances are met.

In addition, the valve elements are consequently relatively large often owing to the housing for the valve itself being capable of ensuring that there is a good seal between members. This can make the containers bulky and difficult to handle, particularly when being handled in a glove box containment apparatus where the dexterity of operators is compromised.

It is an object of the present invention to overcome or alleviate one or more of the problems associated with the prior art.

In accordance with the present invention, there is provided a split valve assembly comprising two valve portions complementarily shaped such that the first can sealingly engage with and co-operate with the second to allow the movement of material therethrough, each valve portion comprising a housing, a valve seat and a valve closure member moveable between a first position in which the valve closure member is displaced from the valve seat and the valve is open, and a second position in which the valve closure member co-operates with the valve seat and the valve is closed, wherein the assembly has a first configuration in which the first and second valve portions engage with one another, the valve closure members being closed, and a second configuration in which the two valve portions are disengaged from one another, the first valve portion having locking means moveable relative to the second valve portion to selectively lock and unlock the two valve portions together.

The present invention provides a valve assembly capable of ensuring a secure and good seal therebetween and which has a simplified mechanism for engagement and securing valve portions together to provide an improved valve system.

The locking means may comprise a locking pair, one member of which is moveable relative to the other and capable of selectively engaging with the other member to lock and unlock portions together.

The locking pair may comprise a male and female member complementarily shaped to one another. The male member is preferably moveable relative to the female member.

The male member is preferably capable of translational movement.

In one embodiment, the male member comprises a pair and the female member comprises a complementarily shaped blind bore for receiving the male member.

The male member is preferably disposed in the active valve portion and the female in the passive valve portion.

The longitudinal axis of the male member may be off-set from that of the female member. Consequently, when the male member engages and is received by the female member, the valve portions are squeezed together to form a better seal therebetween.

In one embodiment the first and second valve portions may be both female members, there being a third valve portion having corresponding male members which the female members can receive.

Each valve portion of the assembly may be mountable on a vessel for containing material, conveyance means, such as a hose, for conveying material and/or other process equipment known to the art. The means for mounting the valve portions may comprise any means known to the art, such as for example a screw thread, interference fit, female:female attachment etc. In an alternative embodiment, the valve portions may be integrally formed with a vessel or conveyance means.

The inlet and outlet of the chamber may be closed once the movement from the first to the second configuration is complete. In so doing, the assembly ensures that the material being transferred therethrough does not come into contact with the surrounding environment.

The valve seat and valve closure member are preferably complementarily shaped to ensure that a seal is formed when the valve closure member is closed.

The valve assembly may be a split butterfly valve, split ball valve, any other split valve or quick release coupling known to the art. Preferably, the assembly is a split butterfly valve.

Preferably, the valve portions form a mating pair, one being a male or active valve portion, the other female or passive.

Preferably, the valve seat comprises a seal member. The seal member may preferably comprise an abutment portion and a resiliency deformable portion located between the abutment portion and the valve housing.

In an alternative embodiment, the valve closure member may be provided with a recess for receipt of a seal which, in use, is adapted to engage against a solid portion of the valve housing.

In the case where the seal is located in a recess in the valve closure member the valve closure member may further comprise an elastomeric material covering the valve closure member and the seal located thereon.

In one embodiment, the valve closure member being pivotable beyond the position in which further displacement is normally prevented by engagement with the valve seal, the valve may further comprise biasing means for biasing the valve closure member into its closed position.

The valve seal may be located either on the valve housing or on the valve closure member.

During use, the assembly may be switched from the first to the second configuration to allow material to be transferred therethrough. Once the material has been transferred, the assembly is switched back to the first configuration and the two valve portions disengaged.

By way of example only, a specific embodiment of the present invention will now be described, with reference to the accompanying drawings, in which;

FIGS. 2a and 2b are perspective views of a valve assembly in accordance with the present invention in its first configuration and second configuration respectively;

FIGS. 5a and b are views of a cut away section through the active valve portion of FIGS. 1-4;

Figure 1:
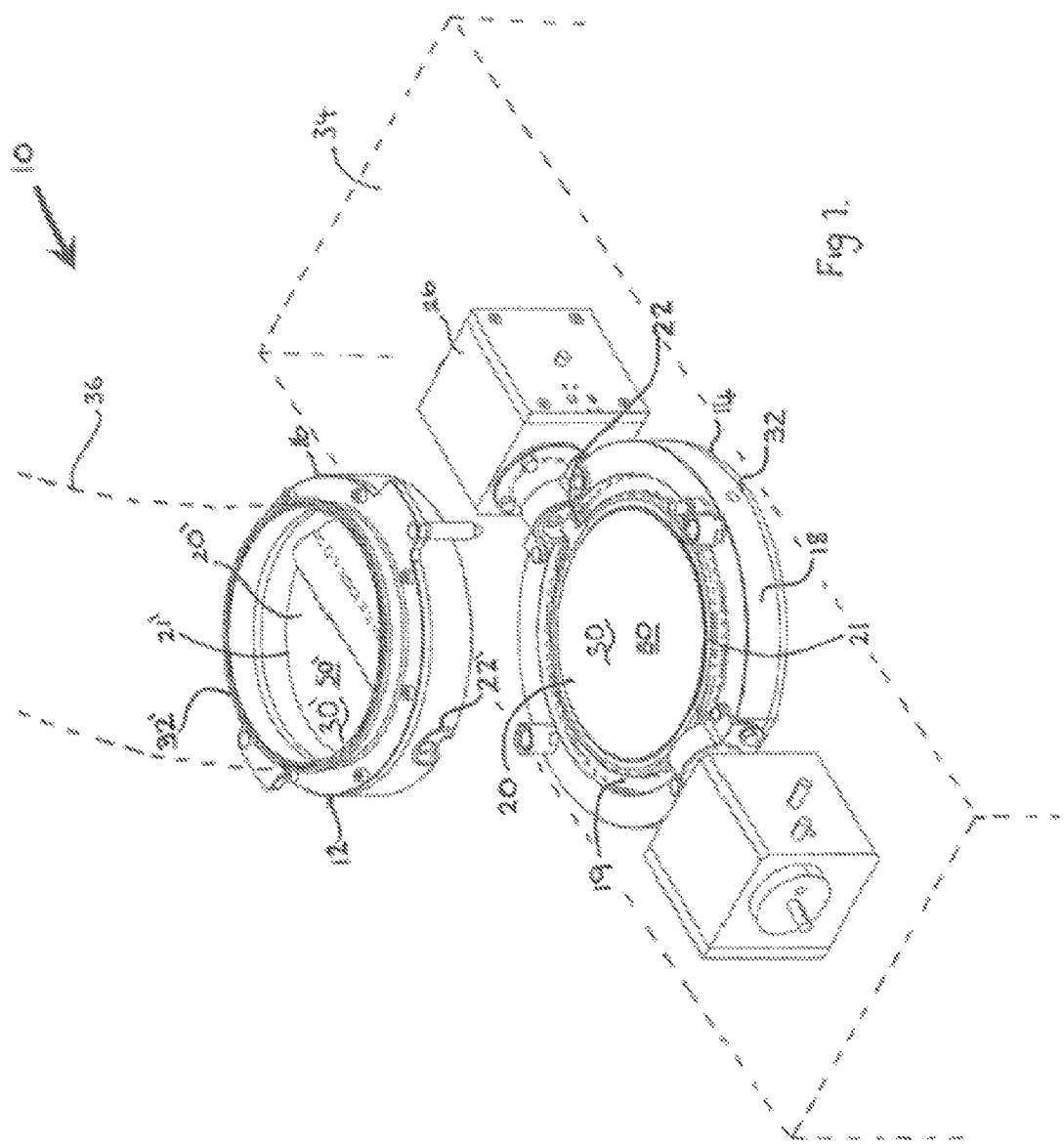
FIG. 1 is a perspective view of two valve portions of a valve assembly in accordance with the present invention.
Figure 4:
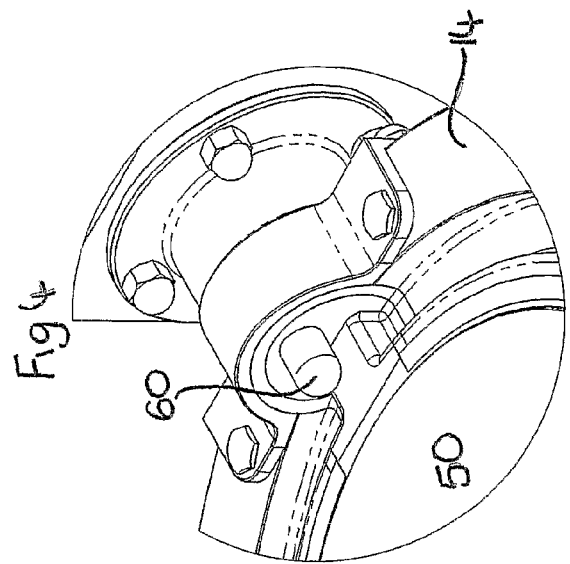
FIG. 4 is a perspective view of the locking means of the active portion of the valve shown in FIG. 3.
Figure 3:
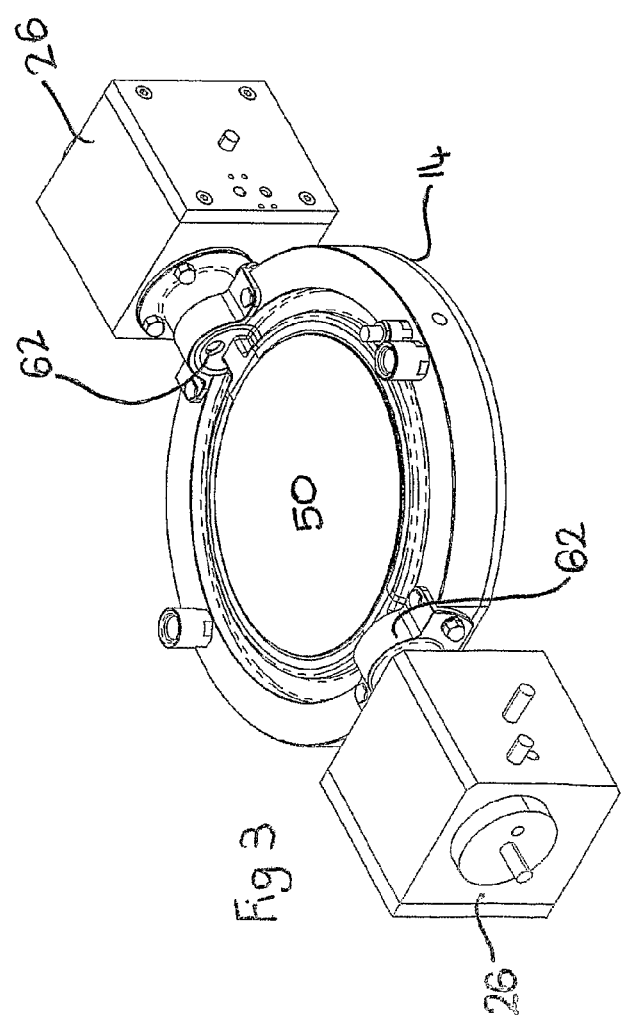
FIG. 3 is a perspective view of the active portion of a valve assembly in accordance with the present invention.

Referring firstly to FIGS. 1 to 4, the valve assembly 10 comprises two valve portions, an upper, passive and lower, active valve portion 12,14, each having a valve housing indicated generally at 16, 18 which are generally annular and a valve closure member 20, 20' which is pivotally mounted within the housing. Valve housing 18 has an annular recess 19. The valve closure member 20,20' is in the form of an annular disc and is provided with spindles 22,22' by means of which the valve closure member is pivotally mounted within the housing. The valve closure member 20,20' and the spindles 22,22' are machined from a single piece of metal.

One of the spindles 22 of the lower valve closure member 18 is operatively connected to actuator 26. Thus, the annular disc is journalled for rotation on the spindles 22,22' and is moved by rotation of the spindle 26. An automatic actuator 26 is received on an opposite end to the annular disc of the spindle 22. Two actuators may be employed, one either side of the spindle of the active valve portion or a manual actuator can be used in an alternative embodiment.

The valve closure member 20,20' is engageable with and disengageable from an annular valve seat 21,21' in the form of an annular seal 23,23' which is seated in a complimentarily-shaped recess 29,29' in the valve housing. The seal comprises a resiliently deformable portion 27,27' and an EPDM annular abutment portion 25,25' (alternatively, perfluoroelastomer or an other suitable material can be used) which, in use, engages the valve closure member 20,20'. In an embodiment, the valve closure member may further comprise an elastomeric material 30,30' covering the valve closure member and the seal located thereon.

The outer end face 32,32' of each of the valve housing portions 16, 18 is planar and in use each face is connected to, for example, adjacent piping sections 36 or a vessel 34 in a manner well known to in the art and a through passage is formed by means of, for example, aligned bores.

The abutment of the two valve housing portions 16,18 form a mating pair such that the upper valve portion 16 is mounted within the lower valve housing portion 18, the upper valve portion 16 being male and the lower valve portion 18 being female. In a first configuration (see FIG. 2) the two valve portions are engaged, such that the valve closure members are sealed from the surrounding environment and that material to be transferred through the valve will not be contaminated by the surrounding environment.

The active or male portion 14 of the valve 10 has two moveably mounted locking pin 60 diametrically opposite one another and located within a housing 62. Each pin 60 is capable of translational movement to move from an unlocking position (see FIG. 3) where the pin is located within the housing 62 to a locking or engaged position whereby the pin 60 extends beyond its housing (see FIG. 4).

The housing 62 forms part of the spindle 22.

Figures 5B, 6A:
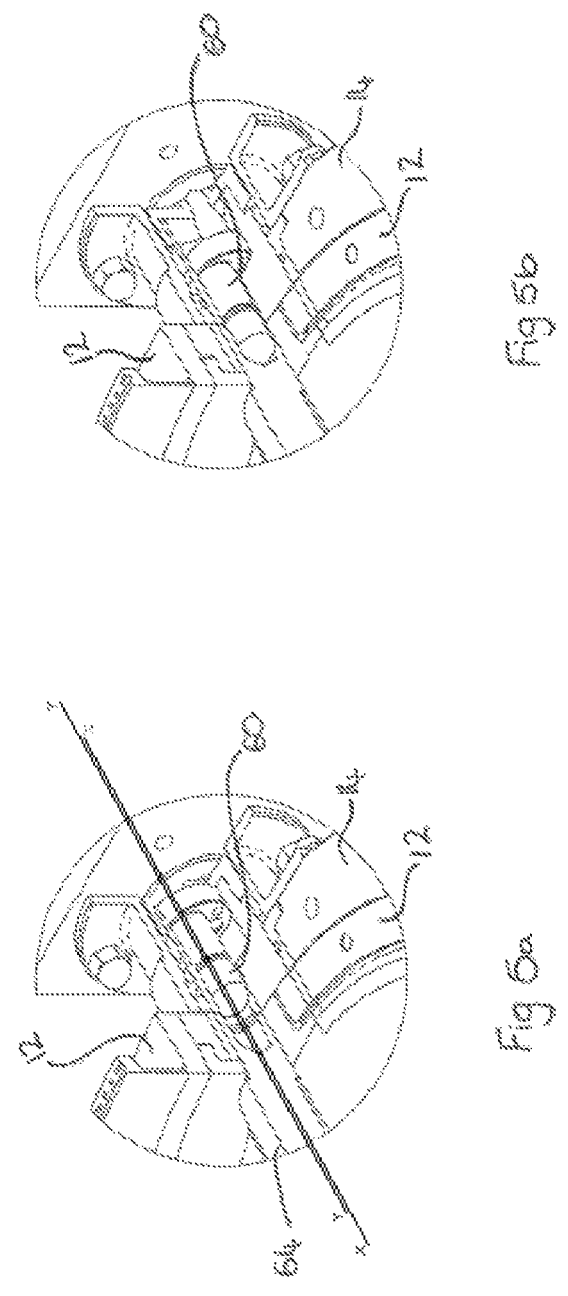

There are two complementarily shaped blind bores 64 that are located in the female valve portion 12 each of which is shaped to receive respective pin 60. FIGS. 5a and b show the locking member engaging with and disengaging with the female or passive portion of the valve. As can be seen, pin 60 is moveable from a retracted position (FIG. 5a) into an extended position (FIG. 5b) where the pin is received in blind bore 54. In one embodiment, the longitudinal axis Y-Y of the pin 60, as a male member, may be off-set from the longitudinal axis X-X of the blind bore 64, as a female member, such that when the pin 50 engages and is received by bore 64, the valve portions 12,14 are squeezed together to form a better seal therebetween.

The valve closure members are adapted to be pivotable through 90 degrees, and when in its fully open position the profile of the inner face 50,50' of the valve closure member 20,20' corresponds with the profile of the through bore of the valve housing, thereby creating no restrictions for the flow of fluid or other material.

The valve assembly can then be fully engaged in its second configuration, whereby seats mate to form a seal and valve closure members 20,20' contact one another and can rotate to open each valve portion respectively, which are sealingly engaged thereby allowing the passage of material therethrough without the material becoming contaminated. Rotation of the spindles 22, 22' of the lower valve closure member 20' will result in rotation of the upper valve closure member 20', The valves of the present invention are able to operate in a complete sterile manner, with, in one embodiment, an in situ sterilisation step before and after each docking, regardless of how many times the valve is split open and re-docked, ensuring sterile conditions on product contact parts.

These barriers can be created by any combination of seals, gaskets, o rings, or seats or inflatable seals.

When the valve is split open into two halves, any material disposed within a vessel etc. will maintain its sterility as each valve portion is sealed from the surrounding atmosphere by the valve closure members.

The invention is not restricted to the details of the foregoing embodiments. For example, the valve actuator may be replaced with a different actuator, such as a manually-operated handle.

An alternative embodiment of the present invention replaces the butterfly valve closure members of the valve with ball closure members.

The invention claimed is:

1. A split valve apparatus, comprising:
   two valve portions complementarily shaped such that the first valve portion is configured to sealingly engage with and co-operate with the second valve portion to allow movement of material through the engaged valve portions, wherein
   each of the two valve portions comprises
      a valve housing,
      a valve seat, and
      a valve closure member moveable between a first position in which the valve closure member is displaced from the valve seat and the valve portion is open, and a second position in which the valve closure member co-operates with the valve seat and the valve portion is closed,
   the apparatus is configured to assume a first configuration in which the first and second valve portions engage with one another with the valve closure members being closed, and a second configuration in which the two valve portions are disengaged from one another,
   the apparatus comprises a locking pair, with the first valve portion comprising a first locking member that is moveable relative to a second locking member on the second valve portion, the first and second locking members being engageable to selectively lock and unlock the two valve portions together,
   the first locking member comprising a male member configured for translational movement, and
   the second locking member in the locking pair is a female member that is complementarily shaped to receive the male member.

2. A split valve apparatus as claimed in claim 1, wherein the male member of the locking pair comprises a pin, and the female member comprises a complementarily shaped blind bore for receiving the mate member.

3. A split valve apparatus as claimed in claim 1, wherein the first locking member, in the form of the male member disposed in the first valve portion is selectively engageable with the second locking member, in the form of the female member in the second valve portion.

4. A split valve apparatus as claimed in claim 1, wherein the longitudinal axis of the male member is off-set from the longitudinal axis of the female member.

5. A split valve apparatus as claimed in claim 1, wherein each valve portion is mountable on a vessel or conveyance means.

6. A split valve apparatus as claimed in claim 1, wherein the valve portions are integrally formed with a vessel or conveyance means.

7. A split valve apparatus as claimed in claim 6, wherein movement of the closure members from the first position to the second position closes the vessel or conveyance means.

8. A split valve apparatus as claimed in claim 1, wherein, in each of the two valve portions, the valve seat and the valve closure member are complementarily shaped such that a seal is formed when the valve closure member is closed.

9. A split valve apparatus as claimed in claim 1, wherein the apparatus is a split butterfly valve or a split ball valve.

10. A split valve apparatus as claimed in claim 1, wherein the valve seat comprises a seal member.

11. A split valve apparatus as claimed in claim 10, wherein the seal member comprises an abutment portion and a resiliently deformable portion.

12. A split valve apparatus as claimed in claim 11, wherein the resiliently deformable portion of the seal member is located between the abutment portion and the valve housing.

13. A split valve apparatus as claimed in claim 10, wherein the valve closure member is provided with a recess for receipt of a seal, which is adapted to engage against a solid portion of the valve housing.

14. A split valve apparatus as claimed in claim 13, wherein the valve closure member comprises an elastomeric material covering the valve closure member.

15. A split valve apparatus as claimed in claim 1, wherein the apparatus comprises a biasing element that biases the valve closure members into the closed second position.

16. A split valve apparatus as claimed in claim 10, wherein the seal member is located on the valve housing, or on the valve closure member.

17. A split valve apparatus as claimed in claim 1, wherein the apparatus is configured to switch during use from the second position to the first position to allow material to be transferred through the apparatus.

18. A split valve apparatus as claimed in claim 17, wherein the apparatus is configured to switch, after completion of the passing of material through the apparatus, from the first configuration to the second configuration and the two valve portions disengage.

19. A method of transferring material comprising the use of a split valve apparatus as claimed in claim 1.

* * * * *